(12) United States Patent
Hallac

(10) Patent No.: US 11,676,014 B1
(45) Date of Patent: Jun. 13, 2023

(54) SYSTEMS, MEDIA, AND METHODS APPLYING MACHINE LEARNING TO TELEMATICS DATA TO GENERATE VEHICLE FINGERPRINT

(71) Applicant: Viaduct, Inc., Menlo Park, CA (US)

(72) Inventor: David Hallac, Palo Alto, CA (US)

(73) Assignee: VIADUCT, INC., Menlo Park, CA (US)

( * ) Notice: Subject to any disclaimer, the term of this patent is extended or adjusted under 35 U.S.C. 154(b) by 528 days.

(21) Appl. No.: 16/791,553

(22) Filed: Feb. 14, 2020

Related U.S. Application Data

(60) Provisional application No. 62/932,008, filed on Nov. 7, 2019, provisional application No. 62/807,508, filed on Feb. 19, 2019.

(51) Int. Cl.

| | | |
|---|---|---|
| *G06N 3/08* | (2023.01) | |
| *G07C 5/00* | (2006.01) | |
| *G07C 5/08* | (2006.01) | |
| *G06Q 10/20* | (2023.01) | |
| *G01D 21/02* | (2006.01) | |
| *B60R 25/25* | (2013.01) | |
| *B60W 50/00* | (2006.01) | |
| *G06N 3/02* | (2006.01) | |
| *G06N 3/082* | (2023.01) | |
| *G06N 3/086* | (2023.01) | |

(Continued)

(52) U.S. Cl.
CPC ............ *G06N 3/08* (2013.01); *B60R 25/252* (2013.01); *B60W 50/0097* (2013.01); *G01D 21/02* (2013.01); *G06N 3/02* (2013.01); *G06N 3/044* (2023.01); *G06N 3/045* (2023.01); *G06N 3/082* (2013.01); *G06N 3/086* (2013.01); *G06Q 10/20* (2013.01); *G07C 5/008* (2013.01); *G07C 5/085* (2013.01); *G06Q 20/4014* (2013.01); *G06Q 40/08* (2013.01)

(58) Field of Classification Search
CPC .......... G06N 3/08; G06N 3/02; G06N 3/0445; G06N 3/0454; G06N 3/082; G06N 3/086; B60R 25/252; B60W 50/0097; G01D 21/02; G06Q 10/20; G06Q 20/4014; G06Q 40/08; G07C 5/008
USPC .......................................................... 706/12
See application file for complete search history.

(56) References Cited

U.S. PATENT DOCUMENTS

| | | |
|---|---|---|
| 7,355,510 B2 | 4/2008 | Rockett et al. |
| 8,352,118 B1 | 1/2013 | Mittelsteadt et al. |

(Continued)

OTHER PUBLICATIONS

Zhang et al, "A Two-Stage Deep Learning Approach for CAN Intrusion Detection", 2018 NDIA Ground Vehicle Systems Engineering and Technology Symposium, Aug. 7-9, 2018, Novi, Michigan (Year: 2018).*

(Continued)

*Primary Examiner* — Tsu-Chang Lee
(74) *Attorney, Agent, or Firm* — Wilson Sonsini Goodrich & Rosati

(57) ABSTRACT

Described herein are systems and methods for applying machine learning to telematics data to generate a unique vehicle fingerprint by periodically receiving telematics data generated at a plurality of sensors of a vehicle; standardizing the telematics data; aggregating the standardized telematics data; applying a trained machine learning model to embed the aggregated telematics data into a low-dimensional state; and generating a unique vehicle fingerprint, the vehicle fingerprint comprising a static component, a dynamic component, or both a static component and a dynamic component; including iterative repetition to update the dynamic component of the vehicle fingerprint.

24 Claims, 6 Drawing Sheets

(51) Int. Cl.
*G06N 3/044* (2023.01)
*G06N 3/045* (2023.01)
G06Q 40/08 (2012.01)
G06Q 20/40 (2012.01)

(56) References Cited

U.S. PATENT DOCUMENTS

| | | | |
|---|---|---|---|
| 9,402,174 | B2 | 7/2016 | Greubel |
| 9,591,482 | B1 | 3/2017 | Finnerty et al. |
| 10,690,740 | B2 * | 6/2020 | Trzasko .................. G01V 3/00 |
| 11,210,537 | B2 * | 12/2021 | Koivisto ................. G05D 1/00 |
| 2005/0097037 | A1 | 5/2005 | Tibor |
| 2008/0238690 | A1 | 10/2008 | Plant |
| 2015/0213555 | A1 | 7/2015 | Barfield, Jr. et al. |
| 2015/0224891 | A1 * | 8/2015 | Petrosian .............. B60L 53/665 |
| | | | 701/31.4 |
| 2017/0057436 | A1 | 3/2017 | Dow et al. |
| 2017/0279957 | A1 | 9/2017 | Abramson et al. |
| 2018/0330178 | A1 * | 11/2018 | el Kaliouby ......... A61B 5/1079 |
| 2019/0394544 | A1 | 12/2019 | Balakrishnan et al. |
| 2020/0090419 | A1 * | 3/2020 | Rajkumar ................ G07C 5/06 |

OTHER PUBLICATIONS

Co-pending U.S. Appl. No. 16/791,543, filed Feb. 14, 2020.
U.S. Appl. No. 16/791,543 Non-Final Office Action dated Sep. 1, 2022.
U.S. Appl. No. 16/791,543 Final Office Action dated Mar. 3, 2023.

* cited by examiner

SYSTEMS, MEDIA, AND METHODS APPLYING MACHINE LEARNING TO TELEMATICS DATA TO GENERATE VEHICLE FINGERPRINT

CROSS-REFERENCE TO RELATED APPLICATIONS

This application claims the benefit of U.S. Provisional Application No. 62/932,008, filed Nov. 7, 2019, and U.S. Provisional Application No. 62/807,508, filed Feb. 19, 2019, each of which is hereby incorporated by reference in its entirety.

BACKGROUND

The way in which an operator operates a vehicle (e.g., drive an automobile) is unique. A vehicle may include sensors and on-board hardware to harvest and process data collected while in use. Analogously, the way in which a vehicle (e.g., an automobile) operates is also unique.

SUMMARY

Telematics data can be employed to generate a unique "fingerprint" (or "signature") for each operator of the vehicle, which can be employed to identify an operator, or to discover characteristic insights about the operator, while he or she is operating the vehicle. Analogously, this telematics data can also be employed to generate a unique fingerprint of the vehicle itself, which can be employed to determine the health of the vehicle and generate insights about future vehicle component and systems failures. One problem with fingerprinting an operator of a vehicle (or the vehicle itself) is inferring a unique "fingerprint" for each operator, to better understand who is operating the vehicle, how well he or she is operating the vehicle, whether the operator is tired or distracted, and how their operation of the vehicle evolves over time. This "fingerprint" (or "signature") may be generated using telematics data that is collected while the vehicle is being operated. In some embodiments, the telematics data is accessed through the vehicle's Controller Area Network (CAN) bus.

Once generated, a fingerprint for an operator or the vehicle is extremely valuable as it can be used for a variety of purposes to understand both the operator and the context that the operator is operating the vehicle in. For example, an operator fingerprint can be used to verify that a particular operator is operating the vehicle to authenticate a credit card payment using an in-vehicle payment system. As another example, an operator fingerprint can be used to provide interpretable risk profiling, which produces actionable insights on an operator's ability. Such insights can be used for, among other things, usage-based insurance purposes. As further example, a vehicle fingerprint can be used to predict when a specific vehicle component or system is likely to malfunction or fail. Moreover, evaluating the temporal evolutions of fingerprints opens up entirely new use cases. For example, when combined with a real-time alert system, fingerprints can be used to detect distracted operators and alert them while they are in such a potentially dangerous scenario as well provide predictive maintenance recommendations.

Determining an operator's or vehicle's fingerprint is a challenge because it must satisfy a number of requirements, while also aggregating large amounts of telematics data into, for example, a low-dimensional representation. As an exemplary requirement, an operator fingerprint must be able to distinguish unique characteristics among different operators or vehicles to effectively identify an individual operator based on their operating patterns. A fingerprint, as another example requirement, must evolve over time based on context (e.g., showing that a given driver is "tired," "stuck in traffic," and so forth). A fingerprint, as yet another example requirement, must be independent of road type, weather, and other exogenous factors. Other example requirements for a fingerprint include that it must be able to capture similarity between operators such that similar operators (e.g., aggressive, distracted, cautious, and so forth) have similar fingerprints and that spatial locations of the fingerprints need to be interpretable along multiple dimensions of interest (e.g., risk, style, driving conditions, and so forth). Analogously, determining a vehicle's fingerprint is also a challenge due to the need to satisfy a number of requirements while also aggregating large amounts of telematics data into, for example, a low-dimensional representation. Currently, no techniques exist that can accomplish all these goals/requirements.

The described is compact and low dimensional and thus easy to transmit when, for example, bandwidth is a constraint. Moreover, the described system is interpretable across various applications, and can also be employed for several purposes at once (e.g., credit card authorization, distracted driving detection, risk profiling, predictive maintenance, and so forth). The described system is transferrable as operators operate (e.g., drive) different vehicles and travel to different locations. Therefore, a determined operator fingerprint can "follow" an operator across various systems and over many years. Similarly, a determined vehicle fingerprint can be used to follow the vehicle across various operators and over many years.

In one aspect, disclosed herein are computer-implemented systems comprising: a digital processing device comprising: at least one processor, an operating system configured to perform executable instructions, a memory, and a computer program including instructions executable by the digital processing device to create an application applying machine learning to telematics data to generate a unique driver fingerprint for an individual, the application comprising: a software module periodically receiving telematics data generated at a plurality of sensors of a vehicle; a software module standardizing the telematics data; a software module aggregating the standardized telematics data; a software module applying a trained machine learning model to embed the aggregated telematics data into a low-dimensional state; and a software module generating a unique driver fingerprint for the individual, the driver fingerprint comprising a static component and/or a dynamic component; wherein some or all of the functions are iteratively repeated to update the dynamic component of the driver fingerprint. In some embodiments, the telematics data originates at a plurality of vehicle sensors connected to the vehicle's CAN bus. In some embodiments, the telematics data is transmitted wirelessly via the vehicle's connectivity module. In some embodiments, the telematics data comprises vehicle data. In further embodiments, the vehicle data comprises one or more of: travel speed, wheel speed, acceleration, orientation, engine revolutions per minute (RPM), engine temperature, coolant temperature, oil temperature, current gear, battery voltage, suspension activity, climate control system settings, window positions, door statuses, mirror positions, internal air temperature, tire pressures, seat belt tension, tire pressure, passenger occupancy, radar status, and personalization settings. In some embodiments, the telematics data comprises environmental data. In further embodiments, the environmental data comprises one or more of: location, altitude, external air temperature, external humidity, precipitation, road type, light, and road condition. In some embodiments, the telematics data comprises driver data. In further embodiments, the driver data comprises one or more of: steering wheel position, steering wheel velocity, brake pedal position, braking force, gas pedal position, shifting, internal lighting use, headlight use, turn signal use, mirror adjustments, window adjustments, climate control system use, entertainment system use, and seat belt use. In some embodiments, the telematics data comprises demographics data. In further embodiments, the demographics data comprises one or more of: age, gender, religion, race, income, education, and employment. In some embodiments, at least some of the telematics data is sequential time series data. In various embodiments, the telematics data is received at least every 15 minutes, 10 minutes, 5 minutes, 1 minute, 45 seconds, 30 seconds, 15 seconds, 10 seconds, 5 seconds, or 1 second, including increments therein. In further embodiments, the telematics data is received substantially continuously. In some embodiments, the machine learning model comprises a neural network. In further embodiments, the neural network is a plurality of stacked recurrent neural networks. In still further embodiments, the neural network comprises a plurality of recurrent neural networks and a fully connected layer. In various embodiments, some or all of the functions are iteratively repeated to update the dynamic component of the driver fingerprint at least every 15 minutes, 10 minutes, 5 minutes, 1 minute, 45 seconds, 30 seconds, 15 seconds, 10 seconds, 5 seconds, or 1 second, including increments therein. In further embodiments, some or all of the functions are iteratively repeated to update the dynamic component of the driver fingerprint substantially continuously. In various embodiments, the driver fingerprint comprises one or more of: a level of aggression, a level of distraction, a level of impairment, a level of driving risk, a level of driving skill, a driving style; and a driver identity. In some embodiments, the application further comprises a software module identifying driver fingerprints, from among a plurality of driver fingerprints, which are similar to each other. In further embodiments, the similarity is measured by a calculated similarity score. In various embodiments, the application further comprises a software module utilizing the driver fingerprint to perform one or more of: authenticate the individual in a payment system, determine an insurance pricing factor for the individual, detect changes in driving behavior of the individual, and personalize vehicle settings for the individual.

In another aspect, disclosed herein are computer-implemented methods of generating a unique driver fingerprint for an individual comprising: periodically collecting, by a computer, telematics data generated at a plurality of sensors of a vehicle; standardizing, by the computer, the telematics data; training, at a compute cluster (such as a GPU cluster), a machine learning model to embed the aggregated telematics data into a low-dimensional state; applying, by the computer or a vehicle, the trained machine learning model to embed the aggregated telematics data into a low-dimensional state; generating, by the computer or the vehicle, a unique driver fingerprint, the driver fingerprint comprising a static component and/or a dynamic component; and iteratively repeating some or all of the steps to update the dynamic component of the driver fingerprint. In some embodiments, the method further comprises: saving, by the computer or the vehicle, weights generated by the trained machine leaning model; and inferring, by the computer or the vehicle, a unique driver fingerprint for the individual based on the weights for novel telematics data generated at a plurality of sensors of the vehicle. In some embodiments, the telematics data originates at a plurality of vehicle sensors connected to the vehicle's CAN bus. In some embodiments, the telematics data is transmitted wirelessly via the vehicle's connectivity module. In some embodiments, the telematics data comprises vehicle data. In further embodiments, the vehicle data comprises one or more of: travel speed, wheel speed, acceleration, orientation, engine RPM, engine temperature, coolant temperature, oil temperature, current gear, battery voltage, suspension activity, climate control system settings, window positions, door statuses, mirror positions, internal air temperature, tire pressures, seat belt tension, tire pressure, passenger occupancy, radar status, and personalization settings. In some embodiments, the telematics data comprises environmental data. In further embodiments, the environmental data comprises one or more of: location, altitude, external air temperature, external humidity, precipitation, road type, light, and road condition. In some embodiments, the telematics data comprises driver data. In further embodiments, the driver data comprises one or more of: steering wheel position, steering wheel velocity, brake pedal position, braking force, gas pedal position, shifting, internal lighting use, headlight use, turn signal use, mirror adjustments, window adjustments, climate control system use, entertainment system use, and seat belt use. In some embodiments, the telematics data comprises demographics data. In further embodiments, the demographics data comprises one or more of: age, gender, religion, race, income, education, and employment. In some embodiments, at least some of the telematics data is sequential time series data. In various embodiments, the collecting the telematics data occurs at least every 15 minutes, 10 minutes, 5 minutes, 1 minute, 45 seconds, 30 seconds, 15 seconds, 10 seconds, 5 seconds, or 1 second, including increments therein. In further embodiments, the collecting the telematics data occurs substantially continuously. In some embodiments, the machine learning model comprises a neural network. In further embodiments, the neural network is a plurality of stacked recurrent neural networks. In still further embodiments, the neural network comprises a plurality of recurrent neural networks and a fully connected layer. In various embodiments, some or all of the steps are iteratively repeated to update the dynamic component of the driver fingerprint at least every 15 minutes, 10 minutes, 5 minutes, 1 minute, 45 seconds, 30 seconds, 15 seconds, 10 seconds, 5 seconds, or 1 second, including increments therein. In further embodiments, some or all of the steps are iteratively repeated to update the dynamic component of the driver fingerprint substantially continuously. In various embodiments, the driver fingerprint comprises one or more of: a level of aggression, a level of distraction, a level of impairment, a level of driving risk, a level of driving skill, a driving style, and a driver identity. In some embodiments, the method further comprises identifying, by the computer, two or more driver fingerprints, from among a plurality of driver fingerprints, which are similar to each other. In further embodiments, the similarity is measured by a calculated similarity score. In various embodiments, the method further comprises utilizing, by the computer or the vehicle, the driver fingerprint to perform one or more of: authenticate the individual in a payment system, determine an insurance pricing factor for the individual, detect changes in driving behavior of the individual, and personalize vehicle settings for the individual.

In yet another aspect, disclosed herein are systems for applying machine learning to telematics data to generate a unique driver fingerprint for an individual comprising: at least one server processor configured to perform at least the following: periodically receive telematics data generated at a plurality of sensors of a vehicle; standardize the telematics data; aggregate the standardized telematics data; apply a trained machine learning model to embed the aggregated telematics data into a low-dimensional state; save weights generated by the trained machine leaning model; transmit the saved weights to the vehicle; and iteratively repeating some or all of the functions to update the transmitted weights; and at least one vehicle processor configured to perform at least the following: receive the transmitted weights; and infer a unique driver fingerprint for the individual based on the transmitted weights for novel telematics data generated at a plurality of sensors of the vehicle, the driver fingerprint comprising a static component and/or a dynamic component. In some embodiments, the telematics data originates at a plurality of vehicle sensors connected to the vehicle's CAN bus. In some embodiments, the telematics data is transmitted wirelessly via the vehicle's connectivity module. In some embodiments, the telematics data comprises vehicle data. In further embodiments, the vehicle data comprises one or more of: travel speed, wheel speed, acceleration, orientation, engine RPM, engine temperature, coolant temperature, oil temperature, current gear, battery voltage, suspension activity, climate control system settings, window positions, door statuses, mirror positions, internal air temperature, tire pressures, seat belt tension, tire pressure, passenger occupancy, radar status, and personalization settings. In some embodiments, the telematics data comprises environmental data. In further embodiments, the environmental data comprises one or more of: location, altitude, external air temperature, external humidity, precipitation, road type, light, and road condition. In some embodiments, the telematics data comprises driver data. In further embodiments, the driver data comprises one or more of: steering wheel position, steering wheel velocity, brake pedal position, braking force, gas pedal position, shifting, internal lighting use, headlight use, turn signal use, mirror adjustments, window adjustments, climate control system use, entertainment system use, and seat belt use. In some embodiments, the telematics data comprises demographics data. In further embodiments, the demographics data comprises one or more of: age, gender, religion, race, income, education, and employment. In some embodiments, at least some of the telematics data is sequential time series data. In various embodiments, the telematics data is received at the at least one server processor at least every 15 minutes, 10 minutes, 5 minutes, 1 minute, 45 seconds, 30 seconds, 15 seconds, 10 seconds, 5 seconds, or 1 second, including increments therein. In further embodiments, the telematics data is received at the at least one server processor substantially continuously. In some embodiments, the machine learning model comprises a neural network. In further embodiments, the neural network is a plurality of stacked recurrent neural networks. In still further embodiments, the neural network comprises a plurality of recurrent neural networks and a fully connected layer. In various embodiments, the model weights are iteratively updated at least every 15 minutes, 10 minutes, 5 minutes, 1 minute, 45 seconds, 30 seconds, 15 seconds, 10 seconds, 5 seconds, or 1 second, including increments therein. In further embodiments, the model weights are iteratively substantially continuously. In various embodiments, the driver fingerprint comprises one or more of: a level of aggression, a level of distraction, a level of impairment, a level of driving risk, a level of driving skill, a driving style, and a driver identity. In some embodiments, the at least one vehicle processor is further configured to identify driver fingerprints, from among a plurality of driver fingerprints, that are similar to each other. In further embodiments, the similarity is measured by a calculated similarity score. In various embodiments, the at least one vehicle processor is further configured to utilize the driver fingerprint to perform one or more of: authenticate the individual in a payment system, determine an insurance pricing factor for the individual, detect changes in driving behavior of the individual, and personalize vehicle settings for the individual.

In one aspect, disclosed herein are computer-implemented systems comprising: a digital processing device comprising: at least one processor, an operating system configured to perform executable instructions, a memory, and a computer program including instructions executable by the digital processing device to create an application applying machine learning to telematics data to generate a unique vehicle fingerprint for a specific vehicle, the application comprising: a software module periodically receiving telematics data generated at a plurality of sensors of a vehicle; a software module standardizing the telematics data; a software module aggregating the standardized telematics data; a software module applying a trained machine learning model to embed the aggregated telematics data into a low-dimensional state; and a software module generating a unique vehicle fingerprint for the specific vehicle, the vehicle fingerprint comprising a static component, a dynamic component, or both a static component and a dynamic component; wherein some or all of the functions are iteratively repeated to update the dynamic component of the vehicle fingerprint. In some embodiments, the telematics data originates at a plurality of vehicle sensors connected to the vehicle's controller area network (CAN) bus. In some embodiments, the telematics data is transmitted wirelessly via the vehicle's connectivity module. In some embodiments, the telematics data comprises vehicle data. In further embodiments, the vehicle data comprises one or more of: travel speed, wheel speed, acceleration, orientation, engine revolutions per minute (RPM), engine temperature, coolant temperature, oil temperature, current gear, battery voltage, suspension activity, climate control system settings, window positions, door statuses, mirror positions, internal air temperature, tire pressures, seat belt tension, tire pressure, passenger occupancy, radar status, diagnostic trouble codes, historical maintenance triggers, and personalization settings. In some embodiments, the telematics data comprises environmental data. In further embodiments, the environmental data comprises one or more of: location, altitude, external air temperature, external humidity, precipitation, road type, light, and road condition. In some embodiments, the telematics data comprises driver data. In further embodiments, the driver data comprises one or more of: steering wheel position, steering wheel velocity, brake pedal position, braking force, gas pedal position, shifting, internal lighting use, headlight use, turn signal use, mirror adjustments, window adjustments, climate control system use, entertainment system use, and seat belt use. In some embodiments, at least some of the telematics data is sequential time series data. In various embodiments, the telematics data is received at least every 15 minutes, 10 minutes, 5 minutes, 1 minute, 45 seconds, 30 seconds, 15 seconds, 10 seconds, 5 seconds, or 1 second. In a particular embodiment, the telematics data is received substantially continuously. In some embodiments, the machine learning model comprises a neural network. In further embodiments, the neural network is a plurality of stacked recurrent neural networks. In still further embodiments, the neural network comprises a plurality of recurrent neural networks and a fully connected layer. In various embodiments, some or all of the functions are iteratively repeated to update the dynamic component of the vehicle fingerprint at least every 15 minutes, 10 minutes, 5 minutes, 1 minute, 45 seconds, 30 seconds, 15 seconds, 10 seconds, 5 seconds, or 1 second. In a particular embodiment, some or all of the functions are iteratively repeated to update the dynamic component of the vehicle fingerprint substantially continuously. In some embodiments, the vehicle fingerprint comprises a component malfunction or vehicle system failure risk. In some embodiments, the vehicle fingerprint comprises a system-aggregated malfunction or failure risk. In some embodiments, the application further comprises a software module identifying vehicle fingerprints, from among a plurality of vehicle fingerprints, which are similar to each other. In further embodiments, the similarity is measured by a calculated similarity score. In some embodiments, the application further comprises a software module utilizing the vehicle fingerprint to predict future component-specific or vehicle-system-specific malfunctions or failures. In some embodiments, the application further comprises a software module utilizing the vehicle fingerprint to predict future system-aggregated malfunctions or failures. In some embodiments, the application further comprises a software module utilizing the vehicle fingerprint to identify and group vehicles based on common component-specific or system-aggregated malfunction or failure histories.

In another aspect, disclosed herein are computer-implemented methods of generating a unique vehicle fingerprint for a specific vehicle comprising: periodically collecting, by a computer, telematics data generated at a plurality of sensors of a vehicle; standardizing, by the computer, the telematics data; training, at a computer cluster, a machine learning model to embed the aggregated telematics data into a low-dimensional state; applying, by the computer or a vehicle, the trained machine learning model to embed the aggregated telematics data into a low-dimensional state; generating, by the computer or the vehicle, a unique vehicle fingerprint, the vehicle fingerprint comprising a static component, a dynamic component, or both a static component and a dynamic component; and iteratively repeating some or all of the steps to update the dynamic component of the vehicle fingerprint. In some embodiments, the method further comprises: saving, by the computer or the vehicle, weights generated by the trained machine leaning model; and inferring, by the computer or the vehicle, a unique vehicle fingerprint for the specific vehicle based on the weights for novel telematics data generated at a plurality of sensors of the vehicle. In some embodiments, the telematics data originates at a plurality of vehicle sensors connected to the vehicle's controller area network (CAN) bus. In some embodiments, the telematics data is transmitted wirelessly via the vehicle's connectivity module. In some embodiments, the telematics data comprises vehicle data. In further embodiments, the vehicle data comprises one or more of: travel speed, wheel speed, acceleration, orientation, engine RPM, engine temperature, coolant temperature, oil temperature, current gear, battery voltage, suspension activity, climate control system settings, window positions, door statuses, mirror positions, internal air temperature, tire pressures, seat belt tension, tire pressure, passenger occupancy, radar status, diagnostic trouble codes, historical maintenance triggers, and personalization settings. In some embodiments, the telematics data comprises environmental data. In further embodiments, the environmental data comprises one or more of: location, altitude, external air temperature, external humidity, precipitation, road type, light, and road condition. In some embodiments, the telematics data comprises driver data. In further embodiments, the driver data comprises one or more of: steering wheel position, steering wheel velocity, brake pedal position, braking force, gas pedal position, shifting, internal lighting use, headlight use, turn signal use, mirror adjustments, window adjustments, climate control system use, entertainment system use, and seat belt use. In some embodiments, at least some of the telematics data is sequential time series data. In various embodiments, the collecting the telematics data occurs at least every 15 minutes, 10 minutes, 5 minutes, 1 minute, 45 seconds, 30 seconds, 15 seconds, 10 seconds, 5 seconds, or 1 second. In a particular embodiment, the collecting the telematics data occurs substantially continuously. In some embodiments, the machine learning model comprises a neural network. In further embodiments, the neural network is a plurality of stacked recurrent neural networks. In still further embodiments, the neural network comprises a plurality of recurrent neural networks and a fully connected layer. In some embodiments, some or all of the steps are iteratively repeated to update the dynamic component of the vehicle fingerprint at least every 15 minutes, 10 minutes, 5 minutes, 1 minute, 45 seconds, 30 seconds, 15 seconds, 10 seconds, 5 seconds, or 1 second. In a particular embodiment, some or all of the steps are iteratively repeated to update the dynamic component of the vehicle fingerprint substantially continuously. In some embodiments, the vehicle fingerprint comprises a component malfunction or vehicle system failure risk. In some embodiments, the vehicle fingerprint comprises a system-aggregated malfunction or failure risk. In some embodiments, the method further comprises identifying, by the computer, two or more vehicle fingerprints, from among a plurality of vehicle fingerprints, which are similar to each other. In further embodiments, the similarity is measured by a calculated similarity score. In some embodiments, the method further comprises utilizing, by the computer or the vehicle, the vehicle fingerprint to predict future component-specific or vehicle-system-specific malfunctions or failures. In some embodiments, the method further comprises utilizing, by the computer or the vehicle, the vehicle fingerprint to predict future system-aggregated malfunctions or failures. In some embodiments, the method further comprises utilizing, by the computer or the vehicle, the vehicle fingerprint to identify and group vehicles based on common component-specific or system-aggregated malfunction or failure histories.

In yet another aspect, disclosed herein are systems for applying machine learning to telematics data to generate a unique vehicle fingerprint for a specific vehicle comprising: at least one server processor configured to perform at least the following: periodically receive telematics data generated at a plurality of sensors of a vehicle; standardize the telematics data; aggregate the standardized telematics data; apply a trained machine learning model to embed the aggregated telematics data into a low-dimensional state; save weights generated by the trained machine leaning model; transmit the saved weights to the vehicle; and iteratively repeating some or all of the functions to update the transmitted weights; and at least one vehicle processor configured to perform at least the following: receive the transmitted weights; and infer a unique vehicle fingerprint for the specific vehicle based on the transmitted weights for novel telematics data generated at a plurality of sensors of the vehicle, the vehicle fingerprint comprising a static component, a dynamic component, or both a static component and a dynamic component. In some embodiments, the telematics data originates at a plurality of vehicle sensors connected to the vehicle's controller area network (CAN) bus. In some embodiments, the telematics data is transmitted wirelessly via the vehicle's connectivity module. In some embodiments, the telematics data comprises vehicle data. In further embodiments, the vehicle data comprises one or more of: travel speed, wheel speed, acceleration, orientation, engine RPM, engine temperature, coolant temperature, oil temperature, current gear, battery voltage, suspension activity, climate control system settings, window positions, door statuses, mirror positions, internal air temperature, tire pressures, seat belt tension, tire pressure, passenger occupancy, radar status, diagnostic trouble codes, historical maintenance triggers, and personalization settings. In some embodiments, the telematics data comprises environmental data. In further embodiments, the environmental data comprises one or more of: location, altitude, external air temperature, external humidity, precipitation, road type, light, and road condition. In some embodiments, the telematics data comprises driver data. In further embodiments, the driver data comprises one or more of: steering wheel position, steering wheel velocity, brake pedal position, braking force, gas pedal position, shifting, internal lighting use, headlight use, turn signal use, mirror adjustments, window adjustments, climate control system use, entertainment system use, and seat belt use. In some embodiments, at least some of the telematics data is sequential time series data. In various embodiments, the telematics data is received at the at least one server processor at least every 15 minutes, 10 minutes, 5 minutes, 1 minute, 45 seconds, 30 seconds, 15 seconds, 10 seconds, 5 seconds, or 1 second. In a particular embodiment, the telematics data is received at the at least one server processor substantially continuously. In some embodiments, the machine learning model comprises a neural network. In further embodiments, the neural network is a plurality of stacked recurrent neural networks. In still further embodiments, the neural network comprises a plurality of recurrent neural networks and a fully connected layer. In various embodiments, some or all of the functions are iteratively repeated to update the weights at least every 15 minutes, 10 minutes, 5 minutes, 1 minute, 45 seconds, 30 seconds, 15 seconds, 10 seconds, 5 seconds, or 1 second. In a particular embodiment, some or all of the functions are iteratively repeated to update the weights substantially continuously. In some embodiments, the vehicle fingerprint comprises a component malfunction or vehicle system failure risk. In some embodiments, the vehicle fingerprint comprises a system-aggregated malfunction or failure risk. In some embodiments, the at least one vehicle processor is further configured to identify vehicle fingerprints, from among a plurality of vehicle fingerprints, that are similar to each other. In further embodiments, the similarity is measured by a calculated similarity score. In some embodiments, the at least one vehicle processor is further configured to utilize the vehicle fingerprint to predict future component-specific or vehicle-system-specific malfunctions or failures. In some embodiments, the at least one vehicle processor is further configured to utilize the vehicle fingerprint to predict future system-aggregated malfunctions or failures. In some embodiments, the at least one vehicle processor is further configured to utilize the vehicle fingerprint to identify and group vehicles based on common component-specific or system-aggregated malfunction or failure histories.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
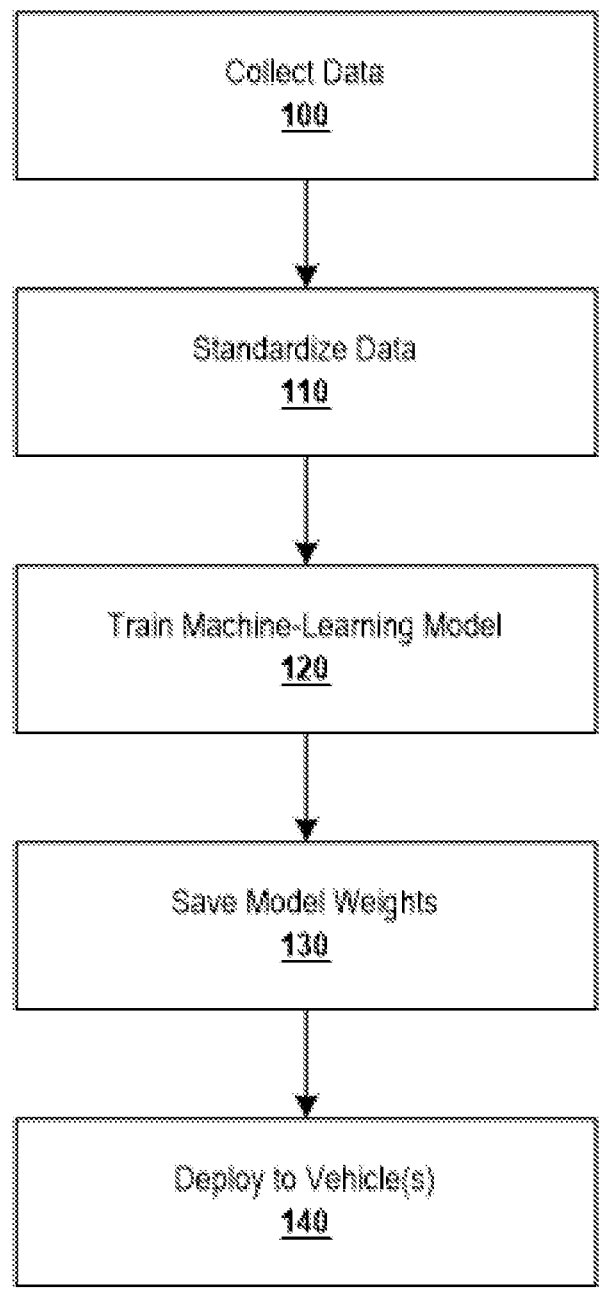
FIG. 1 depicts a non-limiting example of a process for generating a unique driver fingerprint for an individual or vehicle fingerprint for a specific vehicle based on telematics data as described herein.

Described herein, in certain embodiments, are computer-implemented systems comprising: a digital processing device comprising: at least one processor, an operating system configured to perform executable instructions, a memory, and a computer program including instructions executable by the digital processing device to create an application applying machine learning to telematics data to generate a unique driver fingerprint for an individual, the application comprising: a software module periodically receiving telematics data generated at a plurality of sensors of a vehicle; a software module standardizing the telematics data; a software module aggregating the standardized telematics data; a software module applying a trained machine learning model to embed the aggregated telematics data into a low-dimensional state; and a software module generating a unique driver fingerprint for the individual, the driver fingerprint comprising a static component and/or a dynamic component; wherein some or all of the functions are iteratively repeated to update the dynamic component of the driver fingerprint.

Also described herein, in certain embodiments, are computer-implemented methods of generating a unique driver fingerprint for an individual comprising: periodically collecting, by a computer, telematics data generated at a plurality of sensors of a vehicle; standardizing, by the computer, the telematics data; training, at a compute cluster (such as a GPU cluster), a machine learning model to embed the aggregated telematics data into a low-dimensional state; applying, by the computer or a vehicle, the trained machine learning model to embed the aggregated telematics data into a low-dimensional state; generating, by the computer or the vehicle, a unique driver fingerprint, the driver fingerprint comprising a static component and/or a dynamic component; and iteratively repeating some or all of the steps to update the dynamic component of the driver fingerprint.

Also described herein, in certain embodiments, are systems for applying machine learning to telematics data to generate a unique driver fingerprint for an individual comprising: at least one server processor configured to perform at least the following: periodically receive telematics data generated at a plurality of sensors of a vehicle; standardize the telematics data; aggregate the standardized telematics data; apply a trained machine learning model to embed the aggregated telematics data into a low-dimensional state; save weights generated by the trained machine leaning model; transmit the saved weights to the vehicle; and iteratively repeating some or all of the functions to update the transmitted weights; and at least one vehicle processor configured to perform at least the following: receive the transmitted weights; and infer a unique driver fingerprint for the individual based on the transmitted weights for novel telematics data generated at a plurality of sensors of the vehicle, the driver fingerprint comprising a static component and/or a dynamic component.

Described herein, in certain embodiments, are computer-implemented systems comprising: a digital processing device comprising: at least one processor, an operating system configured to perform executable instructions, a memory, and a computer program including instructions executable by the digital processing device to create an application applying machine learning to telematics data to generate a unique vehicle fingerprint for a specific vehicle, the application comprising: a software module periodically receiving telematics data generated at a plurality of sensors of a vehicle; a software module standardizing the telematics data; a software module aggregating the standardized telematics data; a software module applying a trained machine learning model to embed the aggregated telematics data into a low-dimensional state; and a software module generating a unique vehicle fingerprint for the specific vehicle, the vehicle fingerprint comprising a static component, a dynamic component, or both a static component and a dynamic component; wherein some or all of the functions are iteratively repeated to update the dynamic component of the vehicle fingerprint.

Also described herein, in certain embodiments, are computer-implemented methods of generating a unique vehicle fingerprint for a specific vehicle comprising: periodically collecting, by a computer, telematics data generated at a plurality of sensors of a vehicle; standardizing, by the computer, the telematics data; training, at a computer cluster, a machine learning model to embed the aggregated telematics data into a low-dimensional state; applying, by the computer or a vehicle, the trained machine learning model to embed the aggregated telematics data into a low-dimensional state; generating, by the computer or the vehicle, a unique vehicle fingerprint, the vehicle fingerprint comprising a static component, a dynamic component, or both a static component and a dynamic component; and iteratively repeating some or all of the steps to update the dynamic component of the vehicle fingerprint.

Also described herein, in certain embodiments, are systems for applying machine learning to telematics data to generate a unique vehicle fingerprint for a specific vehicle comprising: at least one server processor configured to perform at least the following: periodically receive telematics data generated at a plurality of sensors of a vehicle; standardize the telematics data; aggregate the standardized telematics data; apply a trained machine learning model to embed the aggregated telematics data into a low-dimensional state; save weights generated by the trained machine leaning model; transmit the saved weights to the vehicle; and iteratively repeating some or all of the functions to update the transmitted weights; and at least one vehicle processor configured to perform at least the following: receive the transmitted weights; and infer a unique vehicle fingerprint for the specific vehicle based on the transmitted weights for novel telematics data generated at a plurality of sensors of the vehicle, the vehicle fingerprint comprising a static component, a dynamic component, or both a static component and a dynamic component.

Certain Definitions

Unless otherwise defined, all technical terms used herein have the same meaning as commonly understood by one of ordinary skill in the art to which the described subject matter belongs. As used in this specification and the appended claims, the singular forms "a," "an," and "the" include plural references unless the context clearly dictates otherwise. Any reference to "or" herein is intended to encompass "and/or" unless otherwise stated.

Vehicles

In some embodiments, the platforms, systems, media, and methods described herein include a vehicle. The vehicle may be stationary, moving, or capable of movement. The vehicle may have an interior cabin with space for an operator and one or more passengers. The vehicle may be any suitable terrestrial vehicle, aerial vehicle, aquatic vehicle. A terrestrial vehicle may be a motor vehicle or any other vehicle that uses a source of energy, renewable or nonrenewable (e.g., solar, thermal, electrical, wind, petroleum, etc.), to move across or in close proximity to the ground, such as, for example, within 1 meter, 2 meters, 3 meters of the ground. For example, a terrestrial vehicle may include a car, bus, train, truck, bicycle, motorcycle, forklift, scooter, or any transportation device for use on the ground. An aerial vehicle may be a motor vehicle or any other vehicle that uses a source of energy, renewable or nonrenewable, (solar, thermal, electrical, wind, petroleum, etc.) to move through the air or through space such as a plane, helicopter, or airship. An aquatic vehicle may be a motor vehicle or any other vehicle that uses a source of energy, renewable or nonrenewable, (solar, thermal, electrical, wind, petroleum, etc.) to move across or through water, such as a boat, submarine, or the like.

In some embodiments, a vehicle employed within the described system may include various sensor devices to collected telematics data. Such sensor devices may include, but are not limited to, accelerometers, gyroscopes, magnetometers, position systems, such as a Global Navigation Satellite System (GNSS), barometers, speedometers, and so forth. These sensor devices may be mounted to any side of the vehicle, or to one or more sides of the vehicle, e.g., a front side, rear side, lateral side, top side, or bottom side. The front side of the vehicle may be the side that is facing a general direction of travel of the vehicle; while a rear (or back) side may be the side that is not facing the general direction of travel of the vehicle. The rear side of the vehicle may be opposite to the front side. The front side of the vehicle may point toward a forward direction of travel of the vehicle. The rear side of the vehicle may point towards a rear direction of travel (e.g., reverse) of the vehicle. In some cases, the sensor devices may be mounted between two adjacent sides of a vehicle.

Telematics Data

In some contexts, the described system collects, stores, and processes telematics data from sensors placed within a vehicle or from sensors within or coupled to a mobile device, such as a smart phone, that is within a vehicle. Telematics data can measure the car's environment (e.g., weather, location, altitude) as well as the operator's actions (e.g., steering wheel position, gas and brake pedal press amount). In some embodiments, the telematics data originates at a plurality of vehicle sensors connected to the vehicle's CAN bus. In some embodiments, the telematics data is transmitted wirelessly via the vehicle's connectivity module to a back end system to include a data store (see FIG. 2). In some embodiments, the telematics data comprises vehicle data. Such vehicle data may include, for example, travel speed, wheel speed, acceleration, orientation, engine RPM, engine temperature, coolant temperature, oil temperature, current gear, battery voltage, suspension activity, climate control system settings, window positions, door statuses, mirror positions, internal air temperature, tire pressures, seat belt tension, tire pressure, passenger occupancy, radar status, diagnostic trouble codes, historical maintenance triggers, and personalization settings. In some embodiments, the telematics data comprises environmental data. Such environmental may include, for example, location, altitude, external air temperature, external humidity, precipitation, road type, light, and road condition. In some embodiments, the telematics data comprises driver data. Such driver data may include, for example, steering wheel position, steering wheel velocity, brake pedal position, braking force, gas pedal position, shifting, internal lighting use, headlight use, turn signal use, mirror adjustments, window adjustments, climate control system use, entertainment system use, and seat belt use. In some embodiments, the telematics data comprises demographics data. Such demographics data may include age, gender, religion, race, income, education, and employment. In some embodiments, at least some of the telematics data is sequential time series data. In some embodiments, the telematics data is received at least every 15 minutes, 10 minutes, 5 minutes, 1 minute, 45 seconds, 30 seconds, 15 seconds, 10 seconds, 5 seconds, or 1 second, including increments therein. In some embodiments, the telematics data is received substantially continuously In some contexts, the described system employs mobile sensing technologies to collect, store, and process telematics data from built-in or external sensors of a mobile device, such as a smartphone. In some embodiments, the described system collects telematics data when a vehicle in in motion, or has undergone a significant change in location from a previous known position. In such embodiments, the described system may collect data from the sensors until the vehicle come to rest for a set threshold amount of time.

In some embodiments, the collected telematics data is timestamped. A sequence of such timestamped telematics may be referred to as a recording. In some embodiments, telematics data is collected continuously during a period; in this case, sequences of the collected data may be segmented according to a rule (e.g., sequences that are separated by substantial periods of rest) to form multiple recordings.

In some embodiments, the collected telematics data is standardized. For example, the telematics data may be standardized across makes, models, and brands of vehicles.

Machine Learning Model

Machine learning includes the study of computer modeling of learning processes in their multiple manifestations. In general, learning processes include various aspects such as the acquisition of new declarative knowledge, the devilment of motor and cognitive skills through instruction or practice, the organization of new knowledge into general, effective representations, and the discovery of new facts and theories through observation and experimentations.

In some embodiments, machine learning models are trained and employed to aid in determining a fingerprint for an operator of a vehicle.

Machine learning algorithms can be trained with, for example, telematics data to determine a fingerprint for an operator of a vehicle, which may be subsequently employed within various decision-making processes. In some embodiments, the machine learning models employ regression modelling, wherein relationships between predictor variables and dependent variables are determined and weighted. Examples of algorithms employed to generate a machine learning model include a support vector machine (SVM), a naïve Bayes classification, a random forest, a neural network, deep learning, or other supervised learning algorithm or unsupervised learning algorithm for classification and regression. The machine learning algorithms may be trained using one or more training datasets.

Many data analysis tasks, such as determining a fingerprint for an operator of a vehicle or the vehicle itself, deal with data, such as telematics data, that is presented in high-dimensional spaces and the "curse of dimensionality" phenomena is often an obstacle to the use of many methods, including Neural Network methods, for solving these tasks. To avoid these phenomena, various representation learning algorithms may be employed as a first key step in solutions of these tasks to transform the original high-dimensional data into their lower-dimensional representations so that as much information as possible is preserved about the original data required for the considered task.

As such, inferring low-dimensional representations is a common theme in various fields, including natural language processing and network analysis. In the time series domain, however, existing methods attempt to capture the current state of the system itself, rather than representing the operator controlling the system. These methods are useful in certain contexts, but they do not capture sufficient data about higher-level information (e.g., the operator), instead focusing on the short-term behavior of the vehicle. In other words, these methods encode the "actions" that a vehicle is performing (e.g., turning, braking, and so forth) instead of the "behavior" that the operator is exhibiting (e.g., aggressive, tired, and so forth). Other methods exist for operator identification, but these methods focus solely on the one specific task, such as driver identification, clustering drivers into groups, and so forth, and none of them encode the temporal evolution of each driver over the course of a drive. Instead, they all model each driver as having a "static" state. Furthermore, these methods are all limited to a small number of CAN bus signals, rather than leveraging the majority of the data that is available to them.

Driver Fingerprint

The theory behind an operator's fingerprint is that every operator has an "algorithmic signature." Telematics data can be used to uncover these patterns in behavior, such as: length of trips (e.g., long or short), type of roads driven (e.g., highway, residential roads, or back roads), and style of operating (e.g., smooth driving vs. harsh braking, sudden acceleration, fast cornering, etc.), and so forth).

Various embodiments of the described system determine a fingerprint of an operator of a vehicle based on recorded telematics data. In some embodiments, the recorded telematics data includes time series sensor data collected from vehicles that is labeled with who is operating the vehicle at a given moment in time. In some embodiments, the described system determines a low-dimensional embedding that represents the fingerprint of the operator. In some embodiments, the recorded telematics data is matched to an operator of the vehicle based on an analysis of the collected data and the various operator fingerprints determined by the described system. In some embodiments, at every point in time, a fingerprint embedding is returned by the described system. In some embodiments, this embedding includes a (static) operator embedding for each operator, as well as a (dynamic) context shift which continually varies, which shows how the operator's state has changed due to environmental factors. In such embodiments, this embedding includes a (static) driver embedding for each driver, as well as a (dynamic) context shift which continually varies, which shows how the driver's state has changed due to environmental factors. In some embodiments, the fingerprint evolves over time, based on the context. For example, a "default" fingerprint for each operator may be determined, plus a "variation" that can vary over time (e.g., tired, in traffic, and so forth). In some embodiments, the fingerprint quantifies unique characteristics of each operator.). In some embodiments, the fingerprint is similar for similar types of drivers, and different for other styles of drivers (e.g., aggressive, distracted, cautious, and so forth). In some embodiments, the fingerprint is interpretable and actionable.

The determined fingerprint describes, for example, driving style for a driver. A fingerprint may be employed to, for example, identify whether a specific person is operating a vehicle. In some embodiments, telematics data is collected by sensors in real time and can be employed to train a machine-learning model. Once trained, the machine-learning model may be employed by the described system to covert standardized telematics to a fingerprint for an operator of a vehicle. In some embodiments, a new fingerprint is generated at every timestamp in a collected telematics dataset.

Being able to accurately identify operator behaviors has profound implications for many industries. For example, automobile insurers would be able to give better deals on a usage-based occasional driver insurance policy. Moreover, insurers could evaluate driver behavior and track how often the insured vehicle is driven by the occasional driver right from the telematics data. Furthermore, the fingerprint holds great potential for improving driver and fleet safety by eliminating use of vehicle by unauthorized drivers. Insurers would also be able to track if anyone not on the insurance policy has been driving the vehicle. An operator's fingerprint can also provide an opportunity for targeted driver coaching with customized in-vehicle driver feedback or via a smartphone application.

Vehicle Fingerprint

The theory behind a vehicle's fingerprint is that every vehicle, analogous to an operator, has an "algorithmic signature." Telematics data can be used to uncover these usage patterns and technical system behavior, such as: sensor readings from various vehicle systems, diagnostic trouble codes, maintenance triggers and records, usage patterns (e.g., typical roads driven, operator driving styles, etc.), and so forth.

Various embodiments of the described system determine a unique fingerprint of a vehicle based on recorded telematics and diagnostics data. In some embodiments, the recorded telematics data includes time series sensor data collected from vehicles that is labeled with diagnostic trouble codes. In some embodiments, the described system determines a low-dimensional embedding that represents the fingerprint of the vehicle. In some embodiments, the recorded telematics data is matched to an operator of the vehicle based on an analysis of the collected data and the various operator fingerprints determined by the described system as described above. In some embodiments, at every point in time, a vehicle fingerprint embedding is returned by the described system. In some embodiments, this embedding includes a (static) vehicle embedding for each vehicle, as well as a (dynamic) context shift which continually varies, which shows how the vehicle's state has changed due to environmental factors. In some embodiments, the vehicle fingerprint evolves over time, based on the context. For example, a "default" fingerprint for each vehicle may be determined, plus a "variation" that can vary over time (e.g., overheated, at risk of failure, etc.). In some embodiments, the fingerprint quantifies unique characteristics of each vehicle. In some embodiments, the fingerprint is interpretable and actionable.

The determined vehicle fingerprint describes, for example, vehicle systems health for a specific vehicle. A fingerprint may be employed to, for example, predict whether a specific vehicle is likely to sustain a vehicle system failure. In some embodiments, telematics data is collected by sensors in real time and can be employed to train a machine-learning model. Once trained, the machine-learning model may be employed by the described system to convert standardized telematics to a fingerprint for a vehicle. In some embodiments, a new fingerprint is generated at every timestamp in a collected telematics dataset.

Being able to accurately identify vehicle usage patterns and technical system behaviors has profound implications for many industries. For example, vehicle manufacturers and fleet managers are enabled to proactively identify and repair vehicles before they sustain unexpected failures. Moreover, vehicle manufacturers, fleet managers, and individual vehicle owners are enabled to more accurately assess vehicle value at any point in time right from the telematics data. Furthermore, the vehicle fingerprint holds great potential for vehicle manufacturers and their suppliers to improve upstream vehicle design and manufacturing decisions to design and build safer and more reliable vehicles.

Exemplary Applications and Use Cases

FIG. 1 depicts an example process employed by the described system to generate and update a fingerprint for an operator of a vehicle or the vehicle itself. At 100, a software module periodically receives telematics data generated at a plurality of sensors of a vehicle. In some embodiments, the telematics data originates at a plurality of vehicle sensors connected to the vehicle's CAN bus. In some embodiments, the telematics data is transmitted wirelessly via the vehicle's connectivity module. In some embodiments, the telematics data comprises vehicle data. In some embodiments, the vehicle data comprises one or more of: travel speed, wheel speed, acceleration, orientation, engine RPM, engine temperature, coolant temperature, oil temperature, current gear, battery voltage, suspension activity, climate control system settings, window positions, door statuses, mirror positions, internal air temperature, tire pressures, seat belt tension, tire pressure, passenger occupancy, radar status, diagnostic trouble codes, historical maintenance triggers, and personalization settings. In some embodiments, the telematics data comprises environmental data. In some embodiments, the environmental data comprises one or more of: location, altitude, external air temperature, external humidity, precipitation, road type, light, and road condition. In some embodiments, the telematics data comprises driver data. In some embodiments, the driver data comprises one or more of: steering wheel position, steering wheel velocity, brake pedal position, braking force, gas pedal position, shifting, internal lighting use, headlight use, turn signal use, mirror adjustments, window adjustments, climate control system use, entertainment system use, and seat belt use. In some embodiments, the telematics data comprises demographics data. In some embodiments, the demographics data comprises one or more of: age, gender, religion, race, income, education, and employment. In some embodiments, at least some of the telematics data is sequential time series data. In some embodiments, the telematics data is received at least every 15 minutes, 10 minutes, 5 minutes, 1 minute, 45 seconds, 30 seconds, 15 seconds, 10 seconds, 5 seconds, or 1 second, including increments therein. In some embodiments, the telematics data is received substantially continuously.

At 110, a software module standardizes the telematics data.

At 120, a software module aggregates the standardized telematics data.

At 130, a software module applies a trained machine learning model to embed the aggregated telematics data into a low-dimensional state. In some embodiments, the machine learning model comprises a neural network. In some embodiments, the neural network is a plurality of stacked recurrent neural networks. In some embodiments, the neural network comprises a plurality of recurrent neural networks and a fully connected layer.

At 140, a software module generates a unique fingerprint for the operator of the vehicle or the vehicle itself. In various embodiments, the fingerprint comprises a static component, a dynamic component, or both. In some embodiments, the driver fingerprint comprises a level of aggression. In some embodiments, the driver fingerprint comprises a level of distraction. In some embodiments, the driver fingerprint comprises a level of impairment. In some embodiments, the driver fingerprint comprises a level of driving risk. In some embodiments, the driver fingerprint comprises a level of driving skill. In some embodiments, the driver fingerprint comprises a driving style. In some embodiments, the driver fingerprint comprises a driver identity. In some embodiments, the vehicle fingerprint comprises of one or more of: vehicle health score, component-specific risk score, system-aggregated risk score, component-specific malfunction or failure timeline, system-aggregated malfunction or failure timeline, and component-specific causal pathways.

Steps 110-140 may be iteratively repeated to update the dynamic component of the fingerprint. In some embodiments, steps 110-140 are iteratively repeated to update the dynamic component of the driver and/or vehicle fingerprint at least every 15 minutes, 10 minutes, 5 minutes, 1 minute, 45 seconds, 30 seconds, 15 seconds, 10 seconds, 5 seconds, or 1 second, including increments therein. In some embodiments, steps 110-140 are iteratively repeated to update the dynamic component of the driver and/or vehicle fingerprint substantially continuously. In some embodiments, the example process comprises a software module identifying driver and/or vehicle fingerprints from among a plurality of driver and/or vehicle fingerprints, which are similar to each other. In some embodiments, the similarity is measured by a calculated similarity score. The application further comprises a software module utilizing the driver fingerprint to authenticate the individual in a payment system. In some embodiments, the example process comprises a software module utilizing the driver and/or vehicle fingerprint to authenticate the individual in a payment system. In some embodiments, the example process comprises a software module utilizing the driver and/or vehicle fingerprint to determine an insurance pricing factor for the individual. In some embodiments, the example process comprises a software module utilizing the driver and/or vehicle fingerprint to detect changes in driving behavior of the individual. In some embodiments, the example process comprises a software module utilizing the driver and/or vehicle fingerprint to personalize vehicle settings for the individual. In some embodiments, the application further comprises a software module identifying vehicle fingerprints, from among a plurality of vehicle fingerprints, which are similar to each other. In various embodiments, the application further comprises a software module utilizing the vehicle fingerprint to perform one or more of: identify and group vehicles based on likelihood of component-specific or system-aggregated malfunction or failure over a specific timeline, identify and group vehicles based on common component-specific or system-aggregated malfunction or failure histories.

Figure 2:
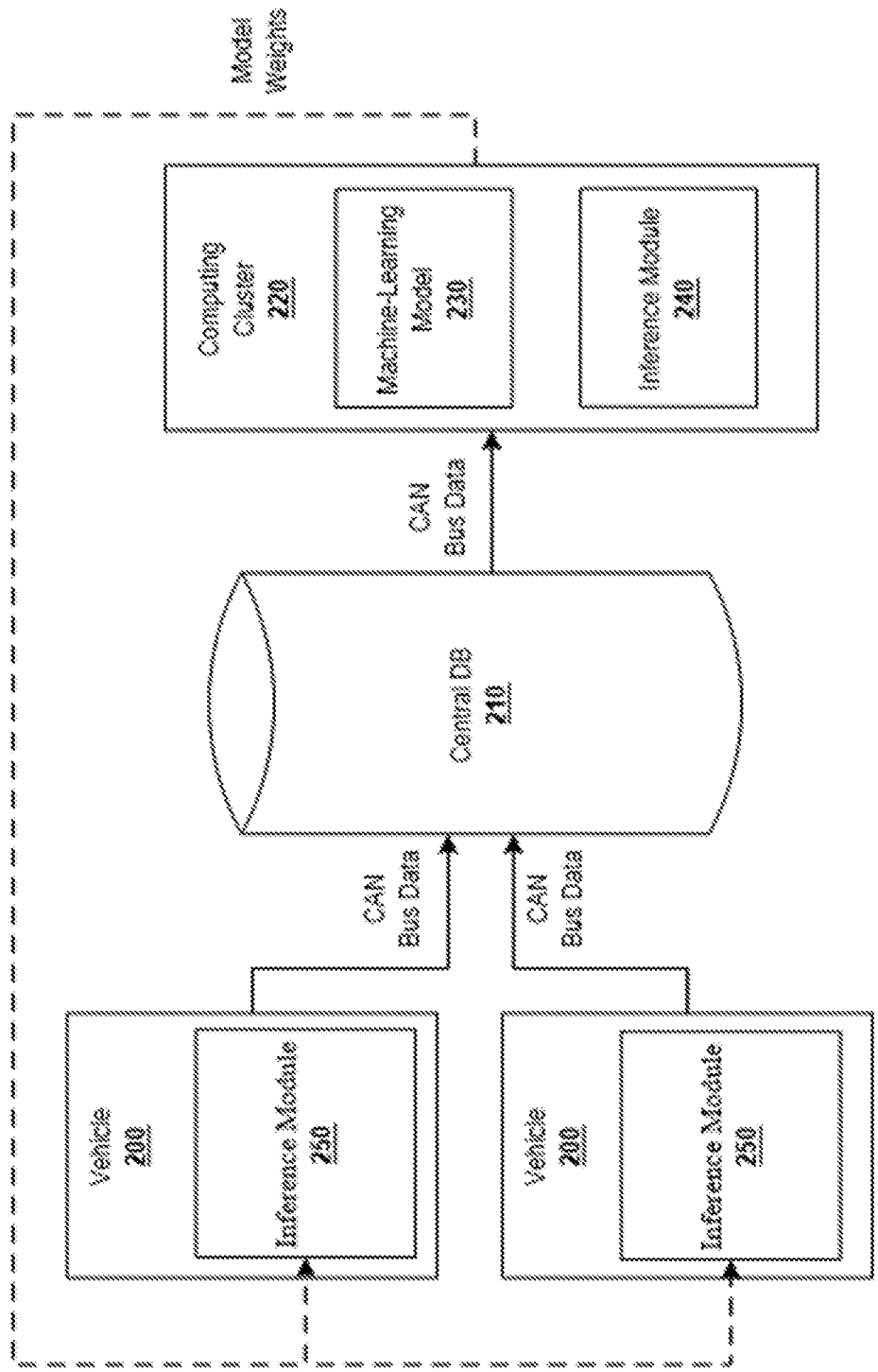
FIG. 2 depicts a non-limiting example of a system for generating a unique driver fingerprint for an individual or vehicle fingerprint for a specific vehicle by applying a machine learning model to telematics data as described herein.

FIG. 2 depicts an example system that may be employed to generate a fingerprint for an operator of a vehicle or the vehicle itself. As depicted, the example system includes vehicles 200, a centralized database 210, a compute cluster (which optionally comprises one or more graphics processing units (GPUs)) 220, and an inference module 250. The vehicles 200 may be coupled to a telematics sensor device. The vehicles 200 communicate the collected telematics data through the CAN bus via a network (not shown) to a backend system that includes a centralized database 210. The telematics data is employed to train a machine-learning model 230 using the compute cluster 220, which comprises, in some embodiments, a GPU cluster. Once the machine-learning model 230 has been trained, the inference module 240 processes the received telematics data through the trained machine-learning model 230 to generate a fingerprint for the operators of each of the vehicles 200 or the vehicles themselves. Model weights from the trained machine-learning module 230 can be employed by the inference module 250 to continuously generate/update the fingerprints for the operators and/or vehicles as additional telematics data is collected for the respective vehicle sensors. In some embodiments, the inference module 250 is deployed to the vehicles 200, such as depicted. In some embodiments, the inference module 250 is deployed via a backend system, such as a cloud-based, to which the vehicle communicates via, for example, a network (see FIG. 5).

Figure 3:
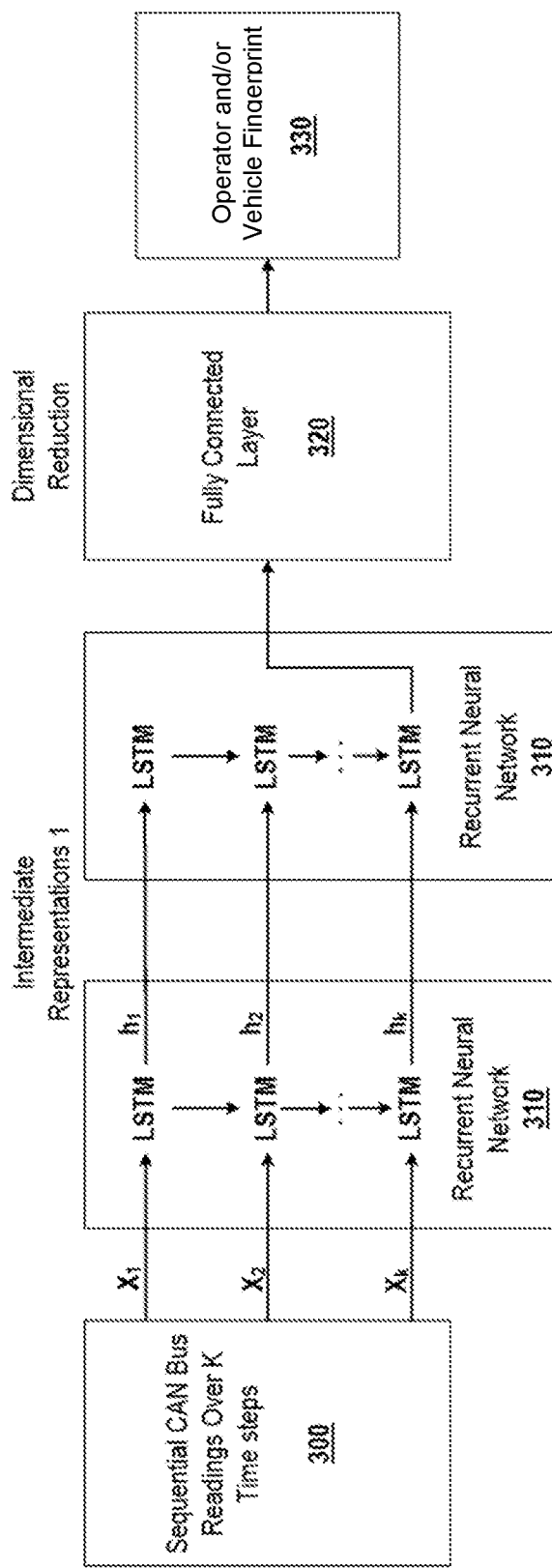
FIG. 3 depicts a non-limiting example of a system for generating a unique driver fingerprint for an individual or vehicle fingerprint for a specific vehicle by applying recurrent neural networks to telematics data as described herein.

FIG. 3 depicts an example system that may be employed to generate a fingerprint 330 for an operator of a vehicle or the vehicle itself. As depicted, sequential CAN bus readings over k timestamps 300 (the telematics data) is fed into multiple stacked LS™ layers of the recurrent neural network 310 to reduce temporal variations. Then, the output of the last LS™ layer is fed to a few fully connected layers, which dimensionally reduces and transform the features into a space that makes that output, the driver fingerprint 330, easier to classify.

Figure 4:
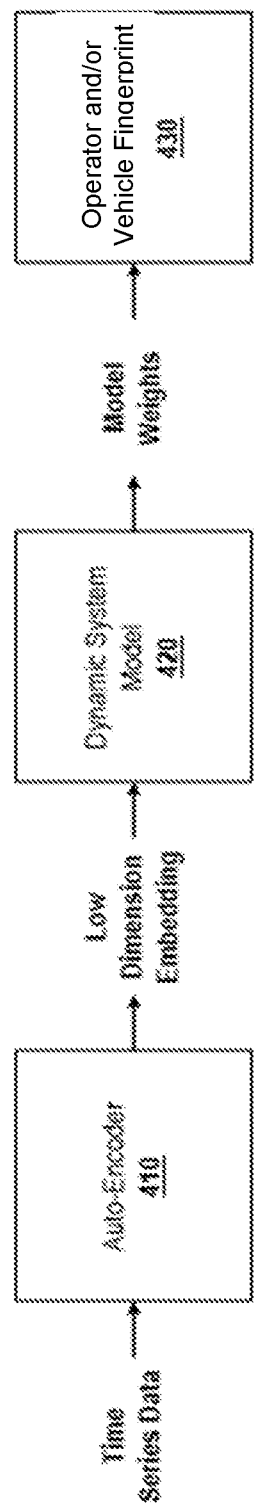
FIG. 4 depicts an example system to generate and update a fingerprint for an operator of a vehicle or the vehicle itself.

FIG. 4 depicts an example system to generate and update a fingerprint for an operator of a vehicle or the vehicle itself. The depicted system includes auto-encoder 410, dynamic system model 420, and the output of the depicted system, the operator and/or vehicle fingerprint 430. In some embodiments, the auto-encoder 410 is a type of artificial neural network used to learn efficient data codings in an unsupervised manner. In some embodiments, the auto-encoder 410 learns a representation (encoding) for a set of data (e.g., the time series data), for dimensionality reduction, by training the network to ignore signal "noise." Along with the reduction side, a reconstructing side is learnt, where the auto-encoder 410 generates a representation as close as possible to its original input from the reduced encoding. The dynamic system model 420 is a machine-learning model, such as machine-learning model 230, trained with telematics data. As depicted, the dynamic system model 420 receives the low dimension embedding of the time-series data from the auto-encoder 410. The models' weights provide the output of the system, which is the operator and/or vehicle fingerprint 430.

Figure 5:
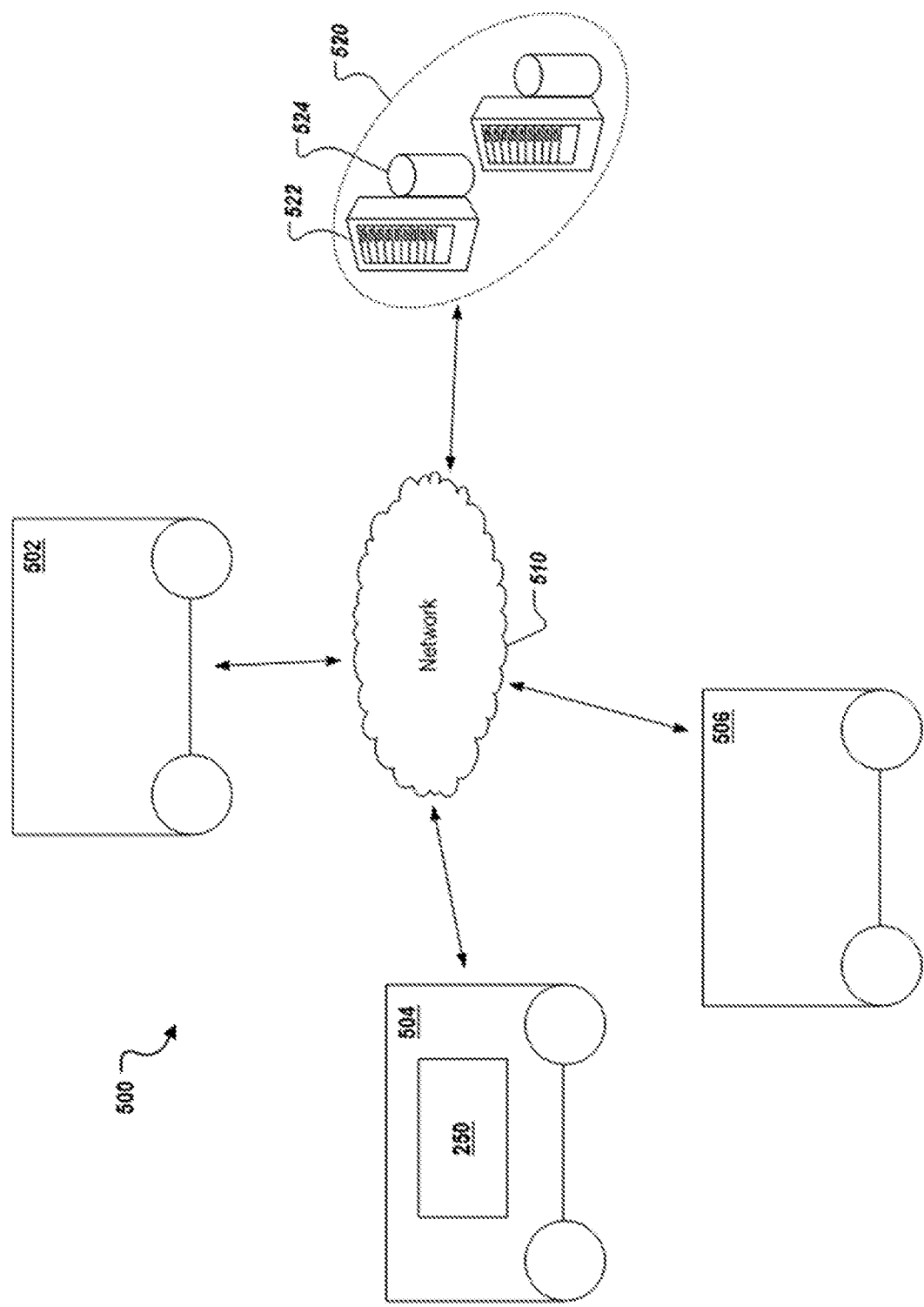
FIG. 5 depicts an example environment that can be employed to execute implementations of the present disclosure.

FIG. 5 depicts an example environment 500 that can be employed to execute implementations of the present disclosure. As depicted, the example environment 500 includes the vehicles 200; a back-end system 520; and a network 510. Vehicles 502, 504, and 506 are substantially similar to vehicle 200 depicted in FIG. 2 and each may employ the inference module 250, which can be deployed directly to the vehicles or accessed on the backend system 520 via the network 510. Three vehicles are depicted in FIG. 5; however, such an environment may be implemented with any number of deployed vehicles. Also, as depicted, the inference module 250 is deployed directly to vehicle 504, while vehicles 502 and 506 access the inference module 250 through the backend system 520 via the network 510. Other possible implementations are contemplated.

In some embodiments, the network 510 includes a local area network (LAN), wide area network (WAN), the Internet, or a combination thereof, and connects web sites, devices (e.g., vehicles 502, 504, and 506) and back-end systems (e.g., the back-end system 520). The network 510 can be the Internet, an internet and/or extranet, or an intranet and/or extranet that is in communication with the Internet. The network 520 in some cases is a telecommunication and/or data network. In some embodiments, the network 510 may be accessed over a wired and/or a wireless communications link. For example, each of the vehicles 502, 504, and 506 may employ a mobile communication device to access the network 510 through, for example, a cellular network.

In some embodiments, the back-end system 520 includes server-class hardware type devices. In some embodiments, the back-end system 520 includes computer systems using clustered computers and components to act as a single pool of seamless resources when accessed through the network 510. For example, such embodiments may be used in data center, cloud computing, storage area network (SAN), and network attached storage (NAS) applications. In some embodiments, back-end system the inference module 250 is deployed using containerization.

In the depicted example environment 500, the back-end system 520 includes at least one server system 522 and a least one data store 524. In some embodiments, the at least one server system 522 hosts one or more computer-implemented services through which the vehicles 502, 504, and 506 may send and receive data. For example, in some embodiments, the vehicles may each provide collected telematics data through a CAN bus to and receive model weights for an inference model 250 deployed to the vehicle from the backend-system 520, such as described previously. In such embodiments, the back-end system 520 may generated an inference model and/or model weights with a trained machine-learning model, such as described previously. In some embodiments, the back-end system 520 provides an application programming interface (API) services with which each of vehicles 502, 504, and 506 may communicate.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT).

In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a vehicle heads-up display (HUD) in communication with the digital processing device.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 6:
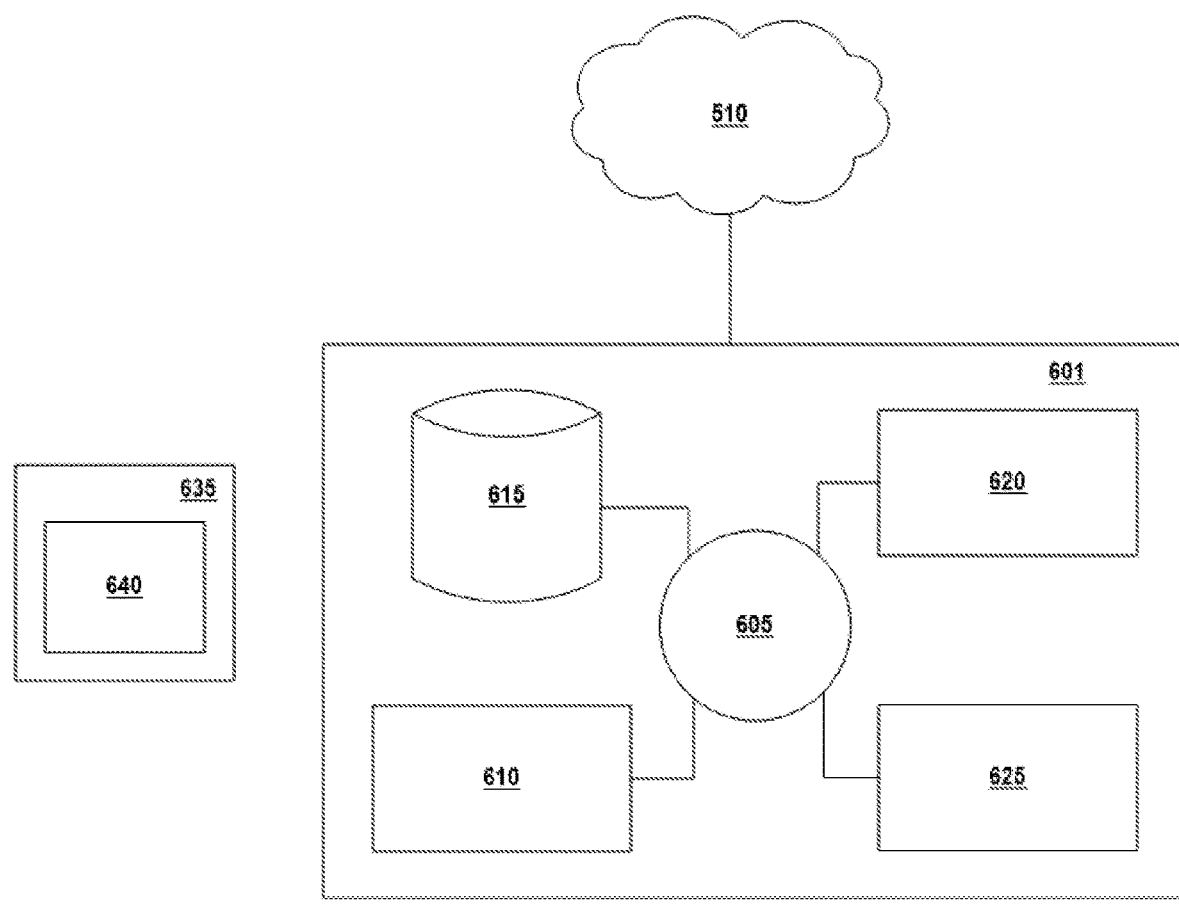
FIG. 6 depicts a non-limiting example of a digital processing device; in this case, a device with one or more CPUs, a memory, a communication interface, and a display.

Referring to FIG. 6, in a particular embodiment, an exemplary digital processing device 601 is programmed or otherwise configured to collect, transmit, receive or process telematics data and/or utilize driver fingerprints. In this embodiment, the digital processing device 601 includes a central processing unit (CPU, also "processor" and "computer processor" herein) 605, which can be a single core or multi core processor, or a plurality of processors for parallel processing. The digital processing device 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The digital processing device 601 can be operatively coupled to the computer network 510 with the aid of the communication interface 620. The network 510, in some cases with the aid of the device 601, can implement a peer-to-peer network, which may enable devices coupled to the device 601 to behave as a client or a server.

Continuing to refer to FIG. 6, the CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and write back. The CPU 605 can be part of a circuit, such as an integrated circuit. One or more other components of the device 601 can be included in the circuit. In some cases, the circuit is an application specific integrated circuit (ASIC) or a field programmable gate array (FPGA).

Continuing to refer to FIG. 6, the storage unit 615 can store files, such as drivers, libraries and saved programs. The storage unit 615 can store user data, e.g., user preferences and user programs. The digital processing device 601 in some cases can include one or more additional data storage units that are external, such as located on a remote server that is in communication through an intranet or the Internet.

Continuing to refer to FIG. 6, the digital processing device 601 can communicate with one or more remote computer systems through the network 510. For instance, the device 601 can communicate with a remote computer system of a user. Examples of remote computer systems include servers, personal computers (e.g., portable PC), slate or tablet computers (e.g., Apple® iPad, Samsung® Galaxy Tab), telephones, smartphones (e.g., Apple® iPhone, Android-enabled device, Blackberry®), or personal digital assistants.

Methods as described herein can be implemented by way of machine (e.g., computer processor) executable code stored on an electronic storage location of the digital processing device 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight. In some embodiments, a web application is written to some extent in a server-side coding language such as Active Server Pages (ASP), ColdFusion®, Perl, Java™, Scala, Go, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Scala, Go, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Scala, Go, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of telematics data, machine learning model weights, driver fingerprint information, and the like. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

While preferred embodiments of the present subject matter have been shown and described herein, it will be obvious to those skilled in the art that such embodiments are provided by way of example only. Numerous variations, changes, and substitutions will now occur to those skilled in the art without departing from the subject matter described herein. It should be understood that various alternatives to the embodiments of the subject matter described herein may be employed.

What is claimed is:

1. A computer-implemented system comprising: a digital processing device comprising: at least one processor, an operating system configured to perform executable instructions, a memory, and a computer program including instructions executable by the digital processing device to create an application applying machine learning to telematics data to generate a unique vehicle fingerprint for a specific vehicle, the application comprising:
   a) a software module periodically receiving telematics data generated at a plurality of sensors of a vehicle, the telematics data comprising heterogeneous, asynchronous time series data with a plurality of frequencies;
   b) a software module standardizing the telematics data;
   c) a software module aggregating the standardized telematics data;
   d) a software module applying a trained machine learning model to embed the aggregated telematics data into a low-dimensional state exposing correlations between sensor evolutions in short-term time series and long-term time series;
   e) a software module generating a unique vehicle fingerprint for the specific vehicle, the vehicle fingerprint comprising a static component comprising vehicle build information, a dynamic component comprising short-term time series telematics data, and a dynamic component comprising long-term time series telematics data; and
   f) a software module utilizing the vehicle fingerprint to predict one or more future component-specific malfunctions or failures, one or more future vehicle-system-specific malfunctions or failures, or one or more future system-aggregated malfunctions or failures for the specific vehicle;
   wherein b)-e) are iteratively repeated to update the dynamic components of the vehicle fingerprint.

2. The system of claim 1, wherein the telematics data originates at a plurality of vehicle sensors connected to the vehicle's controller area network (CAN) bus.

3. The system of claim 1, wherein the telematics data is transmitted wirelessly via the vehicle's connectivity module.

4. The system of claim 1, wherein the telematics data comprises vehicle data.

5. The system of claim 4, wherein the vehicle data comprises one or more of: travel speed, wheel speed, acceleration, orientation, engine revolutions per minute (RPM), engine temperature, coolant temperature, oil temperature, current gear, battery voltage, suspension activity, climate control system settings, window positions, door statuses, mirror positions, internal air temperature, tire pressures, seat belt tension, tire pressure, passenger occupancy, radar status, diagnostic trouble codes, historical maintenance triggers, and personalization settings.

6. The system of claim 1, wherein the telematics data comprises environmental data.

7. The system of claim 6, wherein the environmental data comprises one or more of: location, altitude, external air temperature, external humidity, precipitation, road type, light, and road condition.

8. The system of claim 1, wherein the telematics data comprises driver data.

9. The system of claim 8, wherein the driver data comprises one or more of: steering wheel position, steering wheel velocity, brake pedal position, braking force, gas pedal position, shifting, internal lighting use, headlight use, turn signal use, mirror adjustments, window adjustments, climate control system use, entertainment system use, and seat belt use.

10. The system of claim 1, wherein the telematics data is received at least every 15 minutes, 10 minutes, 5 minutes, 1 minute, 45 seconds, 30 seconds, 15 seconds, 10 seconds, 5 seconds, or 1 second.

11. The system of claim 10, wherein the telematics data is received substantially continuously.

12. The system of claim 1, wherein the machine learning model comprises a neural network.

13. The system of claim 12, wherein the neural network is a plurality of stacked recurrent neural networks.

14. The system of claim 12, wherein the neural network comprises a plurality of recurrent neural networks and a fully connected layer.

15. The system of claim 1, wherein b)-e) are iteratively repeated to update one or both of the dynamic components of the vehicle fingerprint at least every 15 minutes, 10 minutes, 5 minutes, 1 minute, 45 seconds, 30 seconds, 15 seconds, 10 seconds, 5 seconds, or 1 second.

16. The system of claim 15, wherein b)-e) are iteratively repeated to update one or both of the dynamic components of the vehicle fingerprint substantially continuously.

17. The system of claim 1, wherein the vehicle fingerprint comprises a component malfunction or vehicle system failure risk.

18. The system of claim 1, wherein the vehicle fingerprint comprises a system-aggregated malfunction or failure risk.

19. The system of claim 1, wherein the application further comprises a software module identifying vehicle fingerprints, from among a plurality of vehicle fingerprints, which are similar to each other.

20. The system of claim 19, wherein the similarity is measured by a calculated similarity score.

21. The system of claim 1, wherein the application further comprises a software module utilizing the vehicle fingerprint to identify and group vehicles based on common component-specific or system-aggregated malfunction or failure histories.

22. A computer-implemented method of generating a unique vehicle fingerprint for a specific vehicle comprising:
- a) periodically collecting, by a computer, telematics data generated at a plurality of sensors of a vehicle, the telematics data comprising heterogeneous, asynchronous time series data with a plurality of frequencies;
- b) standardizing, by the computer, the telematics data;
- c) training, at a computer cluster, a machine learning model to embed an aggregated telematics data into a low-dimensional state;
- d) applying, by the computer or a vehicle, the trained machine learning model to embed the aggregated telematics data into a low-dimensional state exposing correlations between sensor evolutions in short-term time series and long-term time series;
- e) generating, by the computer or the vehicle, a unique vehicle fingerprint, the vehicle fingerprint comprising a static component comprising vehicle build information, a dynamic component comprising short-term time series telematics data, and a dynamic component comprising long-term time series telematics data;
- f) utilizing, by the computer or the vehicle, the vehicle fingerprint to predict one or more future component-specific malfunctions or failures, one or more future vehicle-system-specific malfunctions or failures, or one or more future system-aggregated malfunctions or failures for the specific vehicle; and
- f) iteratively repeating steps b)-e) to update the dynamic components of the vehicle fingerprint.

23. The method of claim 22, wherein the method further comprises:
- a) saving, by the computer or the vehicle, weights generated by the trained machine leaning model; and
- b) inferring, by the computer or the vehicle, a unique vehicle fingerprint for the specific vehicle based on the weights for novel telematics data generated at a plurality of sensors of the vehicle.

24. A system for applying machine learning to telematics data to generate a unique vehicle fingerprint for a specific vehicle comprising:
- a) at least one server processor configured to perform at least the following:
  - i) periodically receive telematics data generated at a plurality of sensors of a vehicle, the telematics data comprising heterogeneous, asynchronous time series data with a plurality of frequencies;
  - ii) standardize the telematics data;
  - iii) aggregate the standardized telematics data;
  - iv) apply a trained machine learning model to embed the aggregated telematics data into a low-dimensional state exposing correlations between sensor evolutions in short-term time series and long-term time series;
  - v) save weights generated by the trained machine leaning model;
  - vi) transmit the saved weights to the vehicle; and
  - vii) iteratively repeating a) ii)-a) vi) to update the transmitted weights; and
- b) at least one vehicle processor configured to perform at least the following:
  - i) receive the transmitted weights;
  - ii) infer a unique vehicle fingerprint for the specific vehicle based on the transmitted weights for novel telematics data generated at a plurality of sensors of the vehicle, the vehicle fingerprint comprising a static component comprising vehicle build information, a dynamic component comprising short-term time series telematics data, and a dynamic component comprising long-term time series telematics data; and
  - iii) utilize the vehicle fingerprint to predict one or more future component-specific malfunctions or failures, one or more future vehicle-system-specific malfunctions or failures, or one or more future system-aggregated malfunctions or failures for the specific vehicle.

* * * * *